June 25, 1957 W. H. TANKE ET AL 2,796,818
STABILIZER FOR TRACTOR MOUNTED IMPLEMENTS
Filed Nov. 24, 1954 2 Sheets-Sheet 1

Inventors
Willard H. Tanke
August G. Buhr
by Irvin L. Grose
Attorney

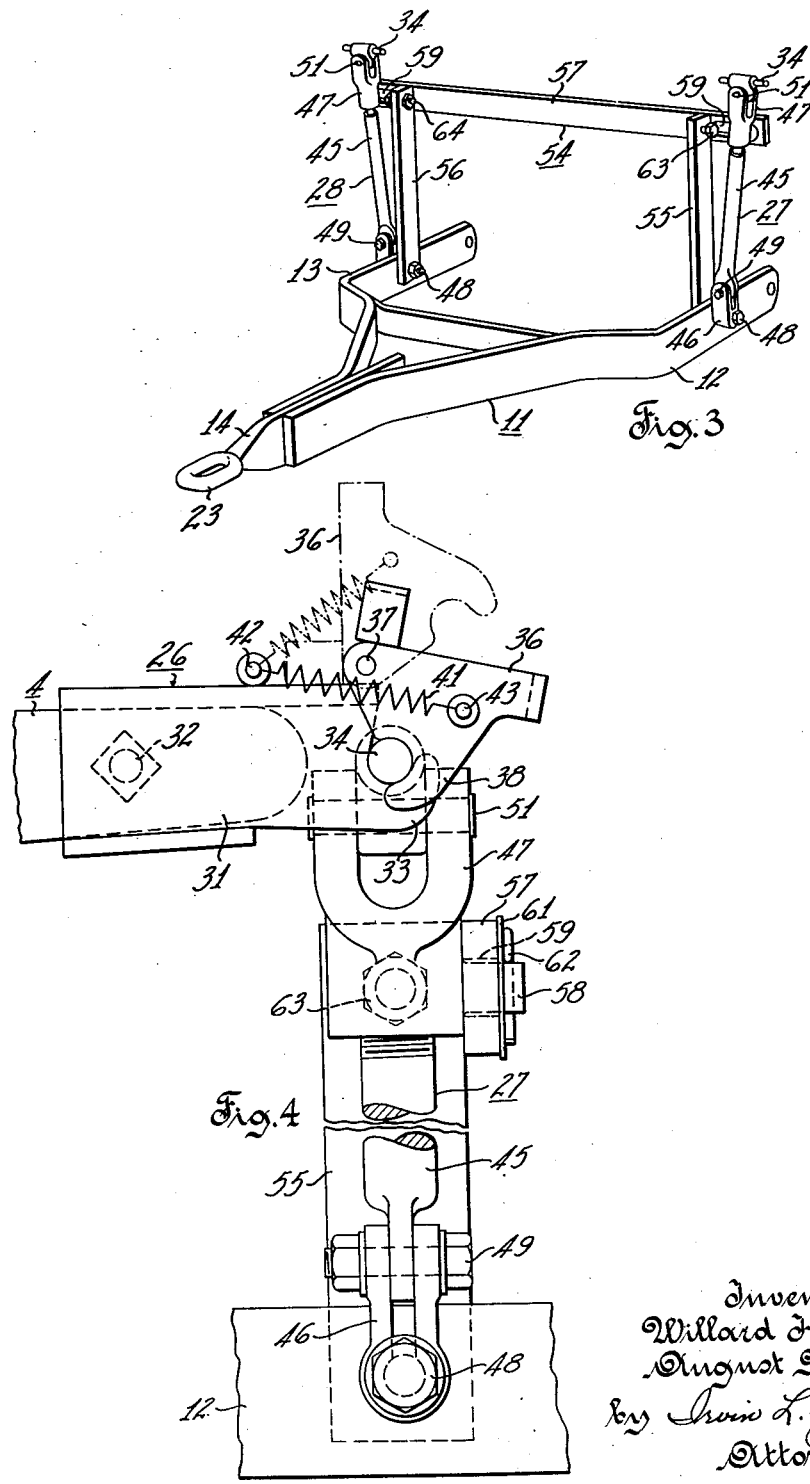

United States Patent Office 2,796,818
Patented June 25, 1957

2,796,818

STABILIZER FOR TRACTOR MOUNTED IMPLEMENTS

Willard H. Tanke and August G. Buhr, La Crosse, Wis., assignors to Allis-Chalmers Manufacturing Company, Milwaukee, Wis.

Application November 24, 1954, Serial No. 470,902

9 Claims. (Cl. 97—47.65)

This invention relates to agricultural machines, and is concerned more particularly with the mounting of earth working tools and other implements on a tractor for operation by the latter.

In order to support various types of agricultural implements on the rear portion of a tractor, suspension mechanisms have heretofore been employed which afford lateral swinging of the implement in addition to vertical adjustment between implement raised and implement lowered positions. In such mechanisms provisions are ordinarily required to limit the amount of lateral swinging movement so that the implement will not collide with the rear wheels of the tractor.

On the other hand, certain types of implements, such as listers and cultivators, require substantial lateral rigidity to obtain the best operating results, and for such implements the suspension mechanism should be correspondingly rigid. The requirement of a laterally rigid suspension mechanism involves certain difficulties because two or more hitch points on the tractor must be simultaneously aligned with corresponding hitch points on the implement.

Another difficulty has heretofore been encountered with certain types of implements, such as listers for example; because, under most conditions these implements should be laterally rigid on the tractor. However, when the soil is extremely hard or when the course of the tractor over the field is not in a straight line, it is desirable to provide for a small amount of lateral side swing of these implements in order to permit easy maneuverability of the tractor. Since the operating conditions may vary for different parts of the same field, it is also desirable that the suspension mechanism be provided with means to readily obtain either complete lateral rigidity or limited lateral swinging movement of the implement relative to the tractor.

Generally, it is an object of the invention to provide an agricultural machine which overcomes the above problems in an entirely satisfactory manner.

More specifically, it is an object of the invention to provide an agricultural machine in which an implement may be mounted on the rear of a tractor for up and down movement and in which lateral movement of the implement relative to the tractor may be selectively permitted, limited or prevented.

It is a further object of the invention to provide an agricultural machine of the above outlined character in which the extent of lateral swinging of the implement may be varied.

Another object of the invention is to provide an agricultural machine of the above outlined character in which the connections for transmitting draft and lifting power from the tractor to the implement and the connections for stabilizing the implement against side swing relative to the tractor may be made expeditiously and without need for careful preparatory alignment of the tractor and implement relative to each other.

These and other advantages and objects are attained by the present invention, various novel features of which will be apparent from the following description and the drawings illustrating a preferred embodiment of the invention, and will be more particularly pointed out in the appended claims.

Referring to the drawings:

Fig. 3 is a perspective detail view of the implement suspension mechanism shown in Figs. 1 and 2; and Fig. 4 is an enlarged view of a portion of the mechanism shown in Fig. 1.

Figure 1:
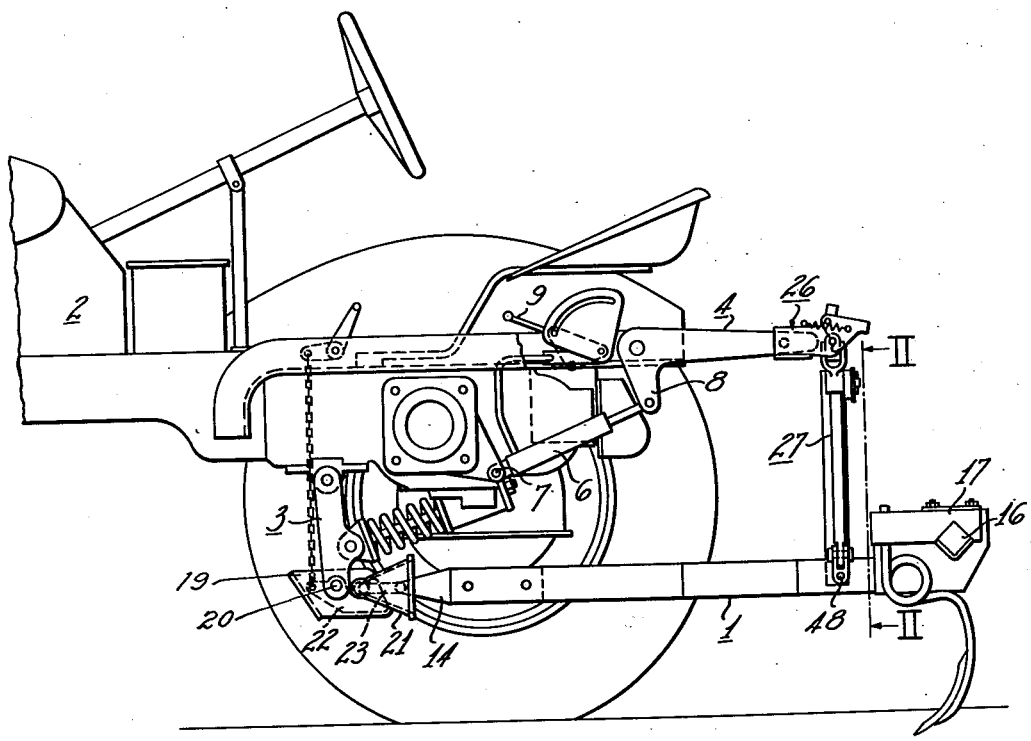
Fig. 1 is a side view of a rear portion of a tractor and associated coil shank cultivator, the near rear wheel of the tractor being removed for purposes of disclosure.

Referring to Fig. 1, an implement 1 is supported on the rear portion of a conventional wheel type tractor 2 which has a depending hitch yoke 3 and a pair of vertically swingable power lift arms 4. The lift arms 4 are connected with a conventional hydraulic actuating mechanism including a hydraulic ram 6 which is mounted on one side of the tractor by a pivot pin 7 and hinged to a lever 8 on one of the tractor mounted arms 4. The hydraulic actuating mechanism also includes a valve mechanism, not shown, which is controlled by a hand lever 9 and operable to either apply lifting power to the arms 4 or to place the arms in a free floating condition for up and down swinging movement relative to the tractor.

The implement 1 is supported on the tractor 2 and as shown in Fig. 3 comprises an elongated A-frame 11 including a pair of side members 12 and 13 which converge at their forward ends and are rigidly connected together and to a tongue element 14. An elongated tool bar 16 is rigidly mounted on rear ends of the side members 12 and 13 in any conventional manner as by clamps 17, only one of which is shown in Fig. 1. Various types of conventional tools, such as coil shank cultivating elements, may be detachably mounted on laterally spaced portions of the tool bar.

The hitch structure which connects the implement 1 with the tractor 2 includes a bracket 19 and a bell housing 21 which are rigidly connected together, as by welding, and the combined bracket and bell housing form a hitch member which is pivotally mounted by means of a transverse hinge pin 20 on the hitch yoke 3 at the underside of the tractor. A draft hook 22 is pivoted on pin 20 within the bell housing 21 and has a spring, not shown, which urges the hook to pivot about the axis of pin 20 so that one end of hook 22 enters an aperture, not shown, in the bottom of bell housing 21. The draft hook 22 engages a coupling eye 23 at the forward end of the tongue element 14 to provide an implement draft connection. This connection is separable by disengagement of the hook 22 from the eye 23 and in the engaged position the hook 22 provides a support for the forward end of the implement frame 11 affording vertical and lateral pivotal movement of the implement 1 relative to the tractor 2.

The hitch structure also includes separable coupling devices 26, respectively, on the lift arms 4 for transmitting lifting power from the arms 4 to the implement 1 through suspension links 27 and 28. Since the coupling devices are identical, reference will be made to Fig. 4 which shows one of the coupling devices 26 associated with the lift link 27. Coupling device 26 comprises a socket member 31 telescopically fitted on the outer end of the associated lift arm 4 and retained in fixed position by a set screw 32. The free end of the socket member 31 is provided with a pair of spaced hook portions 33 which act as bearings for opposite ends of a pin 34 (Fig. 3) mounted on the upper end of link 27. A latch element 36 is pivotally mounted on an upper portion of the socket member 31 by a pin 37 and is also provided with a pair of hook members 38 which, in the latched position, provide an upper bearing surface for the pin 34 associated with link 27.

A tension spring 41 is connected at its opposite ends to anchor points 42 and 43 on said socket member and latch element, respectively, so that when the latch element 36 is in the full line position shown in Fig. 4, the spring 41 acts on a line below the axis of pin 37. In this position, the spring 41 retains the latch member 36 in engagement with link pin 34 so that the hook members 33 and 38 form a bearing for its rotation.

The pin 34 may be disengaged from the socket member 31 by pivoting latch member 36 upwardly to the dot-dash line position shown in Fig. 4. In this position spring 41 acts on a line above pin 37 and retains latch element 36 in an inoperative position to facilitate unhooking of link pin 34 from and its reengagement with hooks 33 of socket member 31.

The suspension links 27 and 28 which complete the lift connection between the lift arms 4 and the implement frame 11 each comprise a rod element 45, a lower clevis member 46 and an upper clevis member 47. Lower clevis member 46 is pivotally connected to one of the side members 12, 13 by a bolt 48, and the upper portion of clevis member 46 is pivotally connected to rod element 45 by a bolt 49 which forms an axis at right angles to the axis of bolt 48. The lower end of upper clevis member 47 is made rigid with rod element 45 as by threaded engagement therewith. The upper portion of upper clevis member 47 includes a knuckle piece 50 pivotally supported by a pin 51. The knuckle piece includes a link pin 34 engaged by socket member 31. Support pin 51 has its axis at a right angle to the axis of pin 34.

Figure 2:
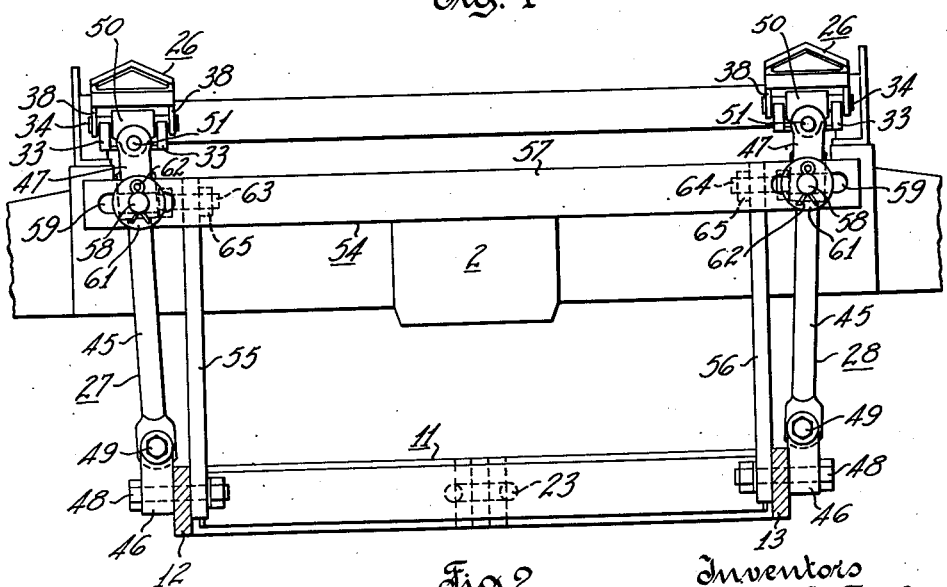
Fig. 2 is a sectional view taken on line II—II in Fig. 1.

It can now be seen that the power lift arms 4 and the suspension links 27 and 28 permit swinging movement of implement 1 so that the implement may swing both vertically and laterally relative to the tractor about the draft connection afforded by the draft hook 22 and the coupling eye 23. As best seen in Fig. 1, during vertical swinging movement of the implement, the lift arms 4 swing vertically and the suspension links 27 and 28 pivot on the lift arms 4 about the transverse axis afforded by the pins 34 and pivot on the implement frame 11 about the transverse axis afforded by the bolts 48. As seen in Fig. 2, during lateral swinging movement of the implement 1 relative to the tractor 2, the suspension links 27 and 28 pivot about longitudinally extending axes afforded by the pair of pins 51 and the pair of bolts 49.

The implement 1 is provided with a U-shaped stabilizer in the form of an abutment structure or bail member 54 which comprises a pair of leg members 55 and 56 rigidly joined together by a bar element 57 which is secured, as by welding, to the upper ends of leg members 55 and 56. Lower ends of the leg members 55 and 56 are connected to the side members 12 and 13, respectively, by the bolts 48 on which the lower clevises 46 are pivoted and which afford a transverse axis on which the bail member 54 pivots. The bail member 54 is detachably connected to upper portions of the links 27 and 28 by pin and slot connections. Referring to Figs. 2 and 4, the upper clevis members 47 each rigidly mount a pin 58, and opposite ends of the bar element 57 are provided with slots 59 which receive the associated pins 58. The stabilizer 54 is retained in engagement with the suspension links 27 and 28 by washers 61 and keys 62.

When the stabilizer 54 is connected to the suspension links 27 and 28, the implement 1 may swing vertically about the draft connection afforded by the draft hook 22 and coupling eye 23 upon actuation of the lift arms 4, but lateral swinging movement of the implement 1 is restricted by engagement of the pins 58 with the ends of slots 59. Slots 59 are elongated longitudinally of stabilizer 54 and cooperate with pins 58 to provide a laterally movable lost motion connection between stabilizer 54 and upper portions of suspension links 27, 28.

The play of the pins 58 lengthwise of the slots 59, therefore, determines the extent of lateral swinging movement of the implement 1 relative to the tractor 2.

As shown in Figs. 2 and 3, the bail member 54 is provided with a pair of adjustable thrust transmitting members or bolts 63 and 64 which are screw threaded into tapped holes of the leg members 55 and 56, respectively. Each of the bolts 63 and 64 is provided with a jam nut 65 which, as shown in Fig. 2, may be drawn up against the corresponding leg member of the bail 54 for locking each bolt 63 and 64 against rotation in any desired position of adjustment relative to the bail 54.

Referring now to Fig. 2, lateral swinging movement of the implement may be prevented by rotating the bolts 63 and 64 in their respective tapped mounting holes of the bail legs 55 and 56 until the heads of the bolts bear against the links 27 and 28, respectively, as shown in Fig. 2. With the bolts in this position the suspension links are not free to pivot on the longitudinal axes afforded by pins 51 and bolts 49 and the implement frame 11, therefore, is laterally rigid relative to the tractor for all vertically adjusted positions.

The implement 1 comprising the frame 11, the suspension links 27 and 28 and the bail member 54 may be prepared for attachment to the tractor 2 by supporting the implement 1 on the ground in an attaching position with the coupling eye 23 elevated above the ground to the same height as the bell housing 21 and by detaching the suspension links 27 and 28 from the bail member 54 so that the upper clevis members 47 may be moved independently of each other. The bail member 54 may be pivoted rearwardly from the position shown in Fig. 1 about the axis formed by bolts 48 to a position in which it will be supported on the tool bar 16 at the rear of the implement frame 11. With the implement in this condition the tractor may be moved rearwardly so that the draft hook 22 engages the coupling eye 23 to complete the draft connection between the tractor and implement.

The lift connection between the tractor and the implement is completed by swinging the latch elements 36 upwardly to the dot-dash position shown in Fig. 4 so that the hook members 33 may receive the pins 34 associated with suspension links 27 and 28. After pins 34 are placed on hooks 33, the latch elements 36 may be pivoted downwardly to engage the pins 34 as shown in the full line position of the latch element 36 in Fig. 4 thereby completing the lift connection. A lift connection between the tractor and implement may be readily accomplished even though the implement frame is positioned for hitching with one side of the implement frame 11 lower than the other. For example, after the draft connection between the draft hook 22 and coupling eye 23 has been completed, the connection between the suspension link on the low side of the implement frame 11 and the coupling device 26 at the corresponding side of the tractor is completed first. This may be accomplished by appropriate relative movement of the suspension link and coupling device into cooperative engagement with each other. Thereafter the lift arms 4 may be actuated to swing upwardly and the other suspension link on the other side of the implement frame 11 may be moved independently of the first suspension link until it engages its corresponding coupling device 26. Upon establishing both lifting connections the implement 1 may be raised to a transport position on the tractor 2.

With the draft and lift connections completed and the implement frame 11 properly positioned on the tractor, the bail member 54 may be pivoted upwardly and forwardly on the bolts 48 to engage suspension links 27 and 28 so that slots 59 receive pins 58. After placing washer 61 on the pin 58, keys 62 may be inserted to hold the bail member 54 in proper position on the suspension links 27 and 28.

With the bail member attached to the suspension links 27 and 28 the operator may adjust the bolts 63 and 64 to engage the suspension links 27 and 28 to make the implement laterally rigid or he may adjust the bolts 63 and 64 to any selected distance from the suspension links 27 and 28 to select the amount of lateral swinging movement required for any particular tool or operating condition. Thereafter, jam nuts 65 may be turned on the bolts 63 and 64 until they engage leg members 55 and 56, respectively, to retain the bolts in their adjusted positions.

To detach the implement 1 from the tractor 2, the implement may be lowered by lift arms 4 until the tool on tool bar 16 rests on the ground. The latch elements 36 may then be raised to the dot-dash line position shown in Fig. 4 and the pins 34 may be removed from the hook members 33 so that the bail member 54 and suspension links 27 and 28 may swing rearwardly and downwardly as a unit about bolts 48 toward the tool bar 16. After draft hook 22 is detached from coupling eye 23 the tractor may be driven away from the implement 1.

It should be understood that it is not intended to limit the invention to the above described forms and details and that the invention includes such other forms and modifications as are embraced by the scope of the appended claims.

It is claimed and desired to secure by Letters Patent:

1. An agricultural machine comprising, in combination: a tractor having a hitch member, an implement unit connected to said hitch member for universal swinging movement relative to said tractor, laterally swingable lift means mounted on said tractor and connected with said implement unit for adjusting the latter vertically between implement raised and lowered positions, said lift means including a pair of suspension elements depending from said tractor and pivotally connected at their opposite ends to said tractor and to said implement unit, respectively, a rigid bail structure pivotally mounted on said implement adjacent lower ends of said pair of suspension elements for engagement with and disengagement from portions of said pair of suspension elements adjacent the upper ends of the latter, and means operatively disposed between said bail structure and said portions of said suspension elements for selectively rendering said implement unit laterally rigid with said mobile structure for all vertical positions of said implement unit on said tractor.

2. An agricultural machine comprising, in combination: a tractor having a hitch member, an implement unit connected to said hitch member for universal swinging movement relative to said tractor, laterally swingable lift means mounted on said tractor and connected with said implement unit for adjusting the latter vertically between implement raised and lowered positions, said lift means including a pair of suspension elements depending from said tractor and pivotally connected at their opposite ends to said tractor and to said implement unit, respectively, a bail member comprising a pair of leg members pivotally connected to laterally spaced portions of said implement unit, respectively, for swinging movement about a transverse axis on said implement unit, a stabilizing bar rigidly connected to said leg members remote from said pivotal connection, and detachable connecting means operatively interposed between said stabilizing bar and upper portions of said suspension elements so as to limit lateral swinging movement of said implement unit relative to said tractor, a pair of screw members adjustably mounted on said bail member for selective engagement with said suspension elements so as to limit lateral swinging movement of said implement unit relative to said tractor.

3. An agricultural machine comprising, in combination: a mobile structure, an implement unit, hitch means connecting said implement unit in supported, draft transmitting relation with said mobile structure and including a pair of suspension elements pivotally connected at their upper ends, respectively, to laterally spaced portions of said mobile structure, pivot means operatively connecting said suspension elements with said implement unit at points in underlying relation, respectively, to said laterally spaced portions on said mobile structure, an abutment structure mounted on said implement unit and having laterally movable lost motion connections with portions of said suspension elements adjacent said laterally spaced portions, respectively, of said mobile structure, and thrust transmitting means mounted on said abutment structure in laterally opposed relation to said suspension elements, said thrust transmitting means being adjustable relative to said abutment structure toward and away from said suspension elements for controlling lateral swinging movement of said implement unit relative to said mobile structure.

4. An agricultural machine comprising, in combination: a tractor having a hitch member, an implement unit connected to said hitch member for universal swinging movement relative to said tractor, a pair of laterally spaced power lift arms operatively mounted on said tractor for up and down movement between implement raised and implement lowered positions, a pair of suspension elements, a pair of separable coupling devices detachably connecting said suspension elements, respectively, in depending relation with said power lift arms for lateral swinging movement relative to said tractor, means operatively connecting said suspension elements in laterally swingable relation with said implement unit, and a rigid bail structure having relatively spaced side members secured, respectively, to said implement unit adjacent lower ends of said pair of suspension elements, and laterally movable lost motion connecting means operatively interposed between upper portions of said bail structure and upper portions of said pair of suspension elements, respectively, said lost motion connecting means being operative to limit lateral swinging movement of said implement relative to said tractor.

5. An agricultural implement comprising an elongated draft frame, laterally swingable suspension elements mounted on said frame at transversely spaced portions of the latter for pivotal movement about a transverse axis, a rigid bail structure mounted on said frame for pivotal movement about said axis, and laterally movable lost motion connecting means between transversely spaced portions of said bail structure and said suspension elements, respectively, at portions of the latter remote from said axis for limiting lateral swinging movement of said elements relative to said bail structure.

6. An agricultural implement according to claim 5 in which said lost motion connecting means comprise a pin and slot connection between each of said laterally spaced portions of said bail structure and the adjacent one of said pair of suspension elements.

7. An agricultural implement according to claim 5 and further comprising a pair of screw members threadably engaged with said bail member in laterally opposed relation to said suspension elements, respectively, said screw members being adjustable transversely of said suspension elements and engageable therewith so as to limit said lateral swinging movement of the latter.

8. An agricultural machine comprising, in combination: a tractor having a hitch member, an implement unit connected to said hitch member for universal swinging movement relative to said tractor, laterally swingable lift means mounted on said tractor and connected with said implement unit for adjusting the latter vertically between implement raised and lowered positions, said lift means including a pair of suspension elements depending from said tractor and pivotally connected at their opposite ends to said tractor and to said implement unit, respectively; a pair of leg members pivotally connected to laterally spaced portions of said implement unit, respectively, for swinging movement about a transverse axis on said implement unit, a transverse stabilizing bar rigidly connected to upper portions of said leg members remote from said pivotal connection and having a pair of slots at its opposite ends, respectively, extending longitudinally of said bar, means including a pair of pins secured to said suspension elements and extending through said slots, respectively, for connecting said bar in detachable, laterally shiftable relation with said suspension elements, and a pair of screw members adjustably mounted on said bail member for lateral engagement with said suspension elements so as to limit lateral swinging movement of said implement unit relative to said tractor.

9. An agricultural machine comprising, in combination: a tractor having a hitch member, an implement unit connected to said hitch member for universal swinging movement relative to said tractor, laterally swingable lift means mounted on said tractor and connected with said implement unit for adjusting the latter vertically between implement raised and lowered positions, said lift means including a pair of suspension elements depending from said tractor and pivotally connected at their opposite ends to said tractor and to said implement unit, respectively, a bail member comprising a pair of leg members rigidly connected together by a stabilizing bar and pivotally mounted at the free ends of said leg members on laterally spaced portions of said implement unit, respectively, for swinging movement about a transverse axis on said implement unit, and detachable connecting means operatively interposed between said stabilizing bar and upper portions of said suspension elements so as to limit lateral swinging movement of said implement unit relative to said tractor.

References Cited in the file of this patent

UNITED STATES PATENTS

| | | |
|---|---|---|
| Re. 21,989 | Morkoski | Dec. 30, 1941 |
| 2,302,502 | Morkoski et al. | Nov. 17, 1942 |
| 2,420,530 | Evans | May 13, 1947 |
| 2,430,732 | Orelind et al. | Nov. 11, 1947 |
| 2,505,580 | Todd | Apr. 25, 1950 |